US010178535B2

(12) United States Patent
Huber et al.

(10) Patent No.: US 10,178,535 B2
(45) Date of Patent: Jan. 8, 2019

(54) SECURE SYSTEM FOR EMERGENCY-MODE OPERATION, SYSTEM MONITORING AND TRUSTED ACCESS VEHICLE LOCATION AND RECOVERY (71) Applicant: AERYON LABS INC., Waterloo (CA)

(72) Inventors: Scott Huber, Waterloo (CA); Nevin McCallum, Waterloo (CA); Sean McCabe, Waterloo (CA); Ian McDonald, Kitchener (CA); Thomas Charles Nagy, Waterloo (CA)

(73) Assignee: AERYON LABS INC., Waterloo (CA)

( * ) Notice: Subject to any disclaimer, the term of this patent is extended or adjusted under 35 U.S.C. 154(b) by 142 days.

(21) Appl. No.: 15/504,518

(22) PCT Filed: Aug. 19, 2015

(86) PCT No.: PCT/CA2015/000469
§ 371 (c)(1),
(2) Date: Feb. 16, 2017

(87) PCT Pub. No.: WO2016/026023
PCT Pub. Date: Feb. 25, 2016

(65) Prior Publication Data
US 2018/0279105 A1    Sep. 27, 2018

Related U.S. Application Data (60) Provisional application No. 62/039,168, filed on Aug. 19, 2014.

(51) Int. Cl.
H04W 76/50       (2018.01)
H04W 4/90        (2018.01)
(Continued)

(52) U.S. Cl.
CPC ............ *H04W 4/90* (2018.02); *B64C 39/024* (2013.01); *H04W 12/06* (2013.01); *H04W 48/12* (2013.01);
(Continued)

(58) Field of Classification Search
CPC ........... B64C 39/024; B64C 2201/141; B64C 2201/146; B64C 2201/027; B64C 39/02;
(Continued)

(56) References Cited

U.S. PATENT DOCUMENTS 7,346,335 B2 * 3/2008 Aaron ................. H04M 3/5116
348/14.01
9,376,208 B1 * 6/2016 Gentry ................. B64C 39/024
(Continued)

FOREIGN PATENT DOCUMENTS

WO      2014116314 A2     7/2014

OTHER PUBLICATIONS

WIPO, International Search Report and Written Opinion for PCT Application No. PCT/CA2015/000469 dated Nov. 19, 2015.

Primary Examiner — Allahyar Kasraian
(74) Attorney, Agent, or Firm — Norton Rose Fulbright Canada LLP (57) ABSTRACT Embodiments described herein relate to an autonomous emergency system (EMS) for UAVs and UMVs. The autonomy of the emergency system enables the vehicle to self-detect that it is in an emergency state (autonomous detection). When vehicle detects the emergency state the vehicle is configured to implement an improved autonomous emergency system process. The vehicle triggers autonomous state change, and controls its operation (auxiliary, power levels, and so on). The vehicle has beacons to emit pulses over time intervals to communicate with specific vehicles. For example, when known, friendly, other vehicles come
(Continued)

into a specific radius, the EMS detects the friendly vehicle(s) and sends safe signals. The EMS implements a pairing communication process based on pre-establish configurations and protocols.

34 Claims, 5 Drawing Sheets

(51) Int. Cl.
  *H04W 48/12* (2009.01)
  *H04W 12/06* (2009.01)
  *H04W 76/10* (2018.01)
  *B64C 39/02* (2006.01)
  *H04W 4/021* (2018.01)

(52) U.S. Cl.
  CPC ........... *H04W 76/10* (2018.02); *H04W 76/50* (2018.02); *B64C 2201/027* (2013.01); *B64C 2201/108* (2013.01); *B64C 2201/127* (2013.01); *B64C 2201/128* (2013.01); *H04W 4/021* (2013.01)

(58) Field of Classification Search
  CPC ........ B64C 2201/145; B64C 2201/122; B64C 2201/00; B64C 2201/182; B64C 25/30; G08G 5/0069; H04W 4/02; H04W 4/90; H04W 76/50; H04W 4/04; H04W 4/40; H04W 4/70; H04W 64/00; H04W 12/08; H04W 48/04; H04W 4/029; G01C 21/20; H04B 7/18506; H04M 1/72538; H04M 1/72572; H04M 1/72533
  USPC .......................................................... 340/902
  See application file for complete search history.

(56) References Cited

U.S. PATENT DOCUMENTS

| | | | |
|---|---|---|---|
| 2014/0117147 A1 | 5/2014 | Hanna et al. | |
| 2016/0009392 A1* | 1/2016 | Korhonen | B64D 1/08 244/137.3 |
| 2016/0274577 A1* | 9/2016 | Heinonen | B64D 1/08 |
| 2016/0340006 A1* | 11/2016 | Tang | B63C 9/01 |

* cited by examiner

SECURE SYSTEM FOR EMERGENCY-MODE OPERATION, SYSTEM MONITORING AND TRUSTED ACCESS VEHICLE LOCATION AND RECOVERY

CROSS-REFERENCE TO RELATED APPLICATION

This application claims the benefit of U.S. Provisional Application No. 62/039,168 entitled Systems for Emergency Mode Operation, Secure System Monitoring and Trusted Access Vehicle Location and Recovery for Aerial and Marine Craft filed Aug. 19, 2014, the entire contents of which is hereby incorporated by reference.

FIELD

The improvements generally relate to the field of aerial and marine vehicles and unmanned vehicles.

INTRODUCTION

An unmanned vehicle does not have a human operator located at the vehicle. An example is an unmanned aerial vehicle ("UAV"). An UAV may include various components such as flight system, sensors and measurement and navigation instruments. Another example is an unmanned marine vehicle ("UMV"). An UMV may also include components such as hydrodynamic design, sensors and measurement and navigation instruments.

SUMMARY

In an aspect, there is provided an emergency system for unmanned vehicles with an operations control for, in response to control signals received from a vehicle control station, controlling operation, navigation and communication for the unmanned vehicle based on a normal mode and an emergency mode of operation; an emergency system with at least one beacon used for transmitting and receiving emergency signals when an emergency state is activated to transmit or emit pulse or signal notifications over time intervals to communicate with other vehicles or stations and to implement a pairing communication process with the other vehicles or stations to authenticate the other vehicles or stations prior to transmission or emission of the pulse or signal notifications; a recovery station for establishing a secured wireless communication link with the emergency system to trigger or monitor the emergency mode of operation; the trigger control that may be activated remotely by recovery station to control the beacon to transmit encrypted emergency signal messages as part of the pulse or signal notifications, where the beacon transmits and receives multi-mode notification messages with the other vehicles or stations when in the emergency mode of operation.

In some embodiments, recovery station provides a user interface to control and establish a communication link with the operations control to control operation, navigation and communication for the unmanned vehicle.

In some embodiments, the emergency system handles operations logging and filters and encrypts log messages for storing on a data storage device.

In some embodiments, the emergency system comprises a tamper proof ruggedized case and low-power separate energy source for the beacon.

In some embodiments, the emergency system comprises peripheral interface between the operations control and the sensors, and an electronic interface between a central processor unit and the other electronics of the vehicle.

In some embodiments, the emergency system may trigger the beacon to emit the pulse signals automatically upon detecting emergency data conditions from the sensors, or may inhibit the beacon permanently or temporarily until the trigger message is received and the other vehicles or stations are authenticated.

In some embodiments, a data storage system is configured for storing the sensor data and other emergency data as directed by a system monitor for logging filtered emergency data. The data storage system may be central and remote from emergency system, or may be internal to emergency system.

In some embodiments, the emergency system may implement various authentication and encryption procedures.

In some embodiments, the emergency system may have system monitor for logging filtered emergency data to a data storage system.

In another aspects, embodiments described herein may provide an unmanned vehicle comprising: an operations control for, in response to control signals received from a vehicle control station, controlling operation, navigation and communication for the unmanned vehicle based on a normal mode and an emergency mode of operation; an emergency system with at least one beacon used for transmitting and receiving emergency signals when an emergency state is activated to transmit or emit pulse signals or notifications over time intervals to communicate with other vehicles or stations and to implement a pairing communication process with configurations and protocol prior to transmission or emission of the pulse signals or notifications; a trigger control that may be activated remotely to control the beacon to transmit encrypted emergency signal messages, where the beacon transmits and receives multi-mode notification messages to provide the signal pulses and to trigger an emergency flight mode; a flight system for implementing the emergency flight mode in response to trigger control; and a communication interface for establishing a wireless communication link between the emergency system and a recovery station to trigger the emergency mode of operation or communication by the beacon.

In some embodiments, the emergency system provides a user interface to control and establish a communication link between an external system and the operations control to control operation, navigation and communication for the unmanned vehicle.

In some embodiments, the emergency system handles operations logging using timestamps on signals from the beacon.

In some embodiments, the emergency system comprises a tamper proof ruggedized case and low-power energy storage for the beacon.

In some embodiments, the emergency system comprises a peripheral interface between the operations control and the sensors, and an electronic interface between a central processor unit and the other electronics of the vehicle.

In some embodiments, the emergency system may trigger the beacon to emit pulses automatically upon detecting emergency data conditions from the sensors, or may inhibit the beacon permanently or temporarily until message received.

In some embodiments, a data storage system stores the sensor data and other emergency data as directed by a system monitor for logging.

In some embodiments, a system monitor logs emergency data to a data storage system using different logging, filtering, encryption and storing procedures.

In another aspect, there is provided an emergency system for unmanned vehicle comprising: at least one beacon used for transmitting and receiving emergency signals when an emergency state is activated to emit pulse notifications over time intervals to communicate with other vehicles or stations and to implement a pairing communication process with configurations and protocol; a recovery station for establishing a wireless communication link with the emergency system to trigger the emergency mode of operation when the emergency state is activated; and a trigger control to control the beacon to transmit encrypted emergency signal messages, where the beacon transmits and receives multi-mode notification messages to provide the signal pulses.

In some embodiments, the recovery station provides a user interface to control and establish a communication link with the operations control to control operation, navigation and communication for the unmanned vehicle.

In some embodiments, the emergency system handles operations logging by writing emergency data to a data storage device using different logging, filtering, encryption and storing procedures.

In some embodiments, the emergency system comprises a tamper proof ruggedized case and low-power energy storage for the beacon.

In some embodiments, the emergency system comprises a peripheral interface between the operations control and the sensors, and an electronic interface between a central processor unit and the other electronics of the vehicle.

In some embodiments, the emergency system may trigger the beacon to emit pulses automatically upon detecting emergency data conditions from the sensors, or may inhibit the beacon permanently or temporarily until an authentication message is received.

In some embodiments, a data storage system stores the sensor data and other emergency data as directed by a system monitor for logging.

In some embodiments, a system monitor logs emergency data to a data storage system.

In some embodiments, the emergency system implements a jettison for the signals.

In some embodiments, the emergency system is configured to generate and store encrypted log messages relating to operation of the unmanned vehicle using one or more encryption keys received in response to one or more detected emergency events to activate the emergency state.

In some embodiments, the emergency system has a user interface with operation control elements to control operation of the unmanned vehicle based on a predetermined condition or a map-based activation.

In some embodiments, the emergency system has an system monitor to control encryption of data stored at a data storage device located on the unmanned vehicle based on one or more data types associated with the data, the data types including, flight variables, location information, sensor data, video or audio recordings, internal system variables, and emergency events.

In some embodiments, the emergency system has a system monitor to filter data collected by the unmanned vehicle and logging filtered data to a data storage device located on the unmanned vehicle or the emergency system.

In some embodiments, the emergency system is configured to inhibit the one or more beacons in response to a state variable being activated, the state variable based on a map-based control so that the decision to inhibit is based on a location of the vehicle.

In some embodiments, the emergency system is configured to inhibit the one or more beacons in response to a state variable being activated, and trigger single burst signals in response to a demand message.

In some embodiments, the emergency system is configured to self-destruct in response to an emergency message or trigger.

In some embodiments, the emergency system is configured to control the transmission or emission of the pulse notifications over increasingly longer time intervals.

In some embodiments, the emergency system is configured to authenticate the other vehicles or stations prior to the transmission or emission of the pulse notifications.

In another aspect, there is provide a process for an emergency system for an unmanned vehicle comprising: authenticating operator identification data of the unmanned vehicle at a vehicle control station to generate an authentication response; recording the authentication response in a data storage device linked to the unmanned vehicle; establishing a secure communication channel between the vehicle control station and the emergency system; transmitting an authentication key from the vehicle control station to the emergency system over the secure communication channel, the authentication key used to generate encrypted notifications by a beacon of the emergency system; storing the authentication key at a system monitor component; generating encrypted log entries using the authentication key, the encrypted log entries for data relating to operation of the unmanned vehicle; detecting one or more emergency events relating to the unmanned vehicle, and in response, inhibiting some or all emergency notifications generated by the beacon of the emergency system; receiving, at the beacon of the emergency system, an additional authentication key to activate some or all of the emergency notifications of generated by the beacon of the emergency system, the emergency notifications encrypted using the additional authentication key.

Many further features and combinations thereof concerning embodiments described herein will appear to those skilled in the art following a reading of the instant disclosure.

DESCRIPTION OF THE FIGURES

In the figures.

DETAILED DESCRIPTION

Embodiments described herein relate to emergency systems for vehicles, including UAVs, UMVs, and so on.

Vehicles may include an emergency system that may be activated when the vehicle enters an emergency state. An example emergency system is an Emergency Position Indicating Radio Beacon (EPIRB) system for commercial manned aircraft. This system may activate a radio beacon when the aircraft on which it is located enters an emergency state. The system allows the aircraft to be more easily located by Search and Rescue teams, who may otherwise only have a general idea of the aircraft's position. Similar distress or emergency systems may be present on marine vehicles.

There are a number of problems with current EPIRB systems, and more generally, the systems relate to emergency mode operation on vehicles. For example, anyone may be able to locate the vehicle simply by listening for the beacon. This is a problem if the vehicle owners do not want the vehicle's position or presence to be discoverable by anyone else. Further, if the beacon is transmitting data, anyone can intercept and store this data. This is a problem if the data being transmitted is intended to be kept secret. In addition, it may be difficult to locate a vehicle in emergency mode without specialized equipment. As a further example, it may be difficult to locate a radio beacon in the presence of high radio noise, signal multi-path degradation or signal jamming. It may be expensive to design a distress beacon system. It may be expensive to manufacture and deploy a distress beacon system, particularly in a cost-sensitive vehicle. A distress beacon system may add considerable weight to a weight-sensitive vehicle. A distress beacon may have a limited emergency-mode lifespan. When the power supply is eventually depleted it stops functioning.

Embodiments described herein relate to an emergency system for UAVs and UMVs where the system may include one or more improved beacons and similar transmitters, transceivers, and so on. Additional example applications may include a variety of vehicles, such as for example, manned and unmanned boats, ships and submarines; manned and unmanned civilian aircraft, manned and unmanned military aircraft, and manned and unmanned commercial aircraft, and so on.

Embodiments described herein relate to an autonomous emergency system (EMS) for UAVs and UMVs. The autonomy of the emergency system enables the vehicle to self-detect that it is in an emergency state (autonomous detection). When vehicle detects the emergency state the vehicle is configured to implement an improved autonomous emergency system process. The vehicle triggers autonomous state change, and controls itself (auxiliary, power levels, and so on). The vehicle and beacons emit pulses over time intervals to communicate with specific vehicles. For example, when known, friendly, or other vehicles come into a specific radius, the EMS detects the friendly vehicle(s) and sends safe signals. The EMS implements a pairing communication process based on pre-establish configurations and protocols.

The EMS involves autonomous emergency system state detection and implements graduated states within the system. For example, the vehicle may operate in a flight mode state for a specific mission (commercial inspection, surveillance, military operations). The operator can trigger EMS or it can put itself into the state based on sensor data (e.g. GPS) after detecting a number of critical data factors. For example, vehicle may detect a specific geographic range, component failure (shot at, internal failure), or other factors, and EMS triggers controlled decent of vehicle. As another example, if the EMS detects a state regarding reduced power levels (e.g. monitor cells in batteries) or a catastrophic failure then with whatever power remains, then EMS initiate an emergency landing while constantly monitoring its own state. A user can manually trigger emergency state as well. As an illustrative commercial example, a service company may be doing a job and another aircraft may come by then EMS may also trigger an emergency maneuver or landing.

As another example vehicle, a UMV may include a marine application where there may be a crash for operator error. A UAV may land on water so may also include marine capabilities triggered based on a marine landing. Sensors may trigger this state, for example. Vehicle itself may not be recoverable in water but the black box EMS may be recoverable. Example embodiments include a waterproof EMS.

Figure 1:
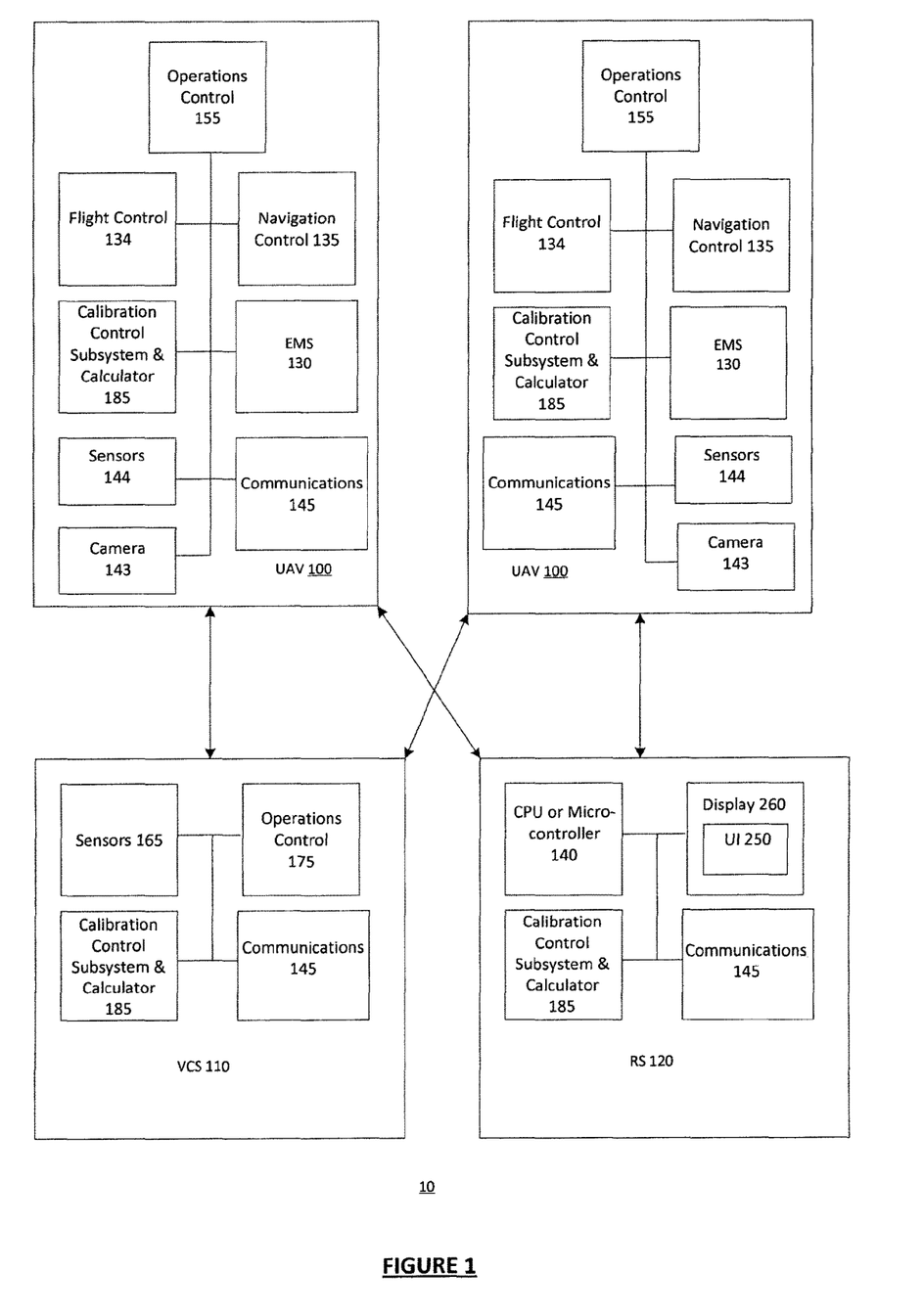
FIG. 1 is a view of an example of an UAV or UMV system with an Emergency Mode System ("EMS")

FIG. 1 shows an illustrative example of system 10 comprising a UAV 100. As will be described herein, UAV 100 is configured for an automatic emergency mode based on a detected emergency state. The system 10 optionally connects UAV 100 to a Vehicle Control Station (VCS) 110 which may be implemented as a computing device. The system 10 optionally includes one or more recovery stations (RSs) 120 in communication with the VCS 110, or integrally connected to the VCS 110 using wired connections for example. The system 10, and in particular, the VCS 110 may serve to remotely control operation of one or more UAVs 100. In some embodiments, UAV 100 is configured for autonomous emergency operations control and calibration without use of VCS 110. UAV 100 is configured to generate UAV 100 status data from sensor subsystem 165, and to transmit the UAV 100 status data to the VCS 110 or RS 120. The UAV 100 status data may be transmitted to the VCS 110 or RS 120 in real-time, or near real-time. The UAV 100 status data may include UAV 100 location data from sensors 165, images and video from camera 143, component status, and so on. The UAV 100 status data may include navigation and other measurement data from navigation control 135, as well as operating parameters from operations control 155 and flight control data from flight control 134. The UAV 100 status data may include communication status data from communication devices 145.

The RS 120 is configured to display at least a subset of the received UAV 100 status data for each UAV 100 in an interface. Display 260 may provide a graphical representation of the respective UAV 100 location data of each of the UAVs 100. Through the interface, the VCS 110 or RS 120 may receive control command input. The control command input is associated with one of the UAVs 100 having its UAV 100 status data displayed in the interface. The VCS 110 or RS 120 may then transmit the received control command, or a command derived therefrom, to the respective UAV 100. The interface may enable a user to view status and control operation of each of the UAVs 100 such that the location of each UAV 100 is shown in the interface, and each UAV 100 may be independently controlled through the interface by selecting a particular one of the UAVs 100 to control. In this way, multiple UAVs 100 may be monitored and controlled through an interface at control station. The interface may enable triggering of the emergency operation mode, for example. The interface may enable triggering of the beacon for signal transmission. The VCS 110 or RS 120 may include a trigger control for the emergency operations mode.

The RS 120 or VCS 110 may comprise a communications subsystem 145, a processor or central computer system 140 and a display 260. The communications subsystem 145 allows for wireless remote communications between the VCS 110 and each UAV 100, and between the VCS 110 and each RS 120, when RSs 120 are used. A user interface 250 (or UI) is generated by processor 140 for display on the display 260 of a VCS 110, which remotely controls the UAVs 100, or as part of a control system for one or more UAVs 100. Display 260 may be a touch-screen display, but a more traditional non-touch display may be used. VCS 110 or RS 120 may be on a single-unit computer (i.e. one with a built-in display), or a multi-unit computer (i.e. with a separate display) may be used.

VCS 110 provides multi-vehicle control with synchronization, across multiple interface panels. The interface provides an indication of which UAV 100 is being controlled. Each panel shows a different perspective on what is happening, but the states of the panels may be synchronized, such that changing the currently selected UAV 100 in one panel changes the currently selected UAV 100 in the other panels, and each panel clearly indicates the currently selected UAV 100. Further detail on the controlling UAV 100 using interface 180 is provided in PCT Application No. PCT/CA2013/000442 entitled "System and Method for Controlling Unmanned Aerial Vehicles", the entire contents of which is hereby incorporated by reference.

A VCS 110 may also have a sensor subsystem 165 (which may include a global positioning system (GPS) subsystem), a wireless communications subsystem 175 and an operations controller or calibration control and subsystem calculator 185, as described in U.S. Provisional Application No. 62/118,276 entitled "Systems And Methods For Calibrating Unmanned Aerial Vehicles", the entire contents of which is hereby incorporated by reference.

In some embodiments, the system may comprise UAV 100 which is either an aircraft or marine craft.

In some embodiments, the system may comprise VCS 110, the main control station for the UAV 100. It may be a mobile system (such as a tablet computer), a fixed system (such as a desktop computer or control console) or may be part of a larger mobile or fixed system (such as a multi-vehicle operations centre). An example embodiment for VCS 110 is a mobile, tablet computer system. VCS 110 presents user interface (e.g. UI 250 of FIG. 4) to the operator, by which interface the operator operates UAV 100.

VCS 110 has a communications link to the UAV 100. In some embodiments, the link may be a directly coupled wired link, a direct wireless link, a relayed wireless link, or a wired link to another wireless communications system. A wireless link may be relayed by a relay station, in an example embodiment of the communications link.

In some embodiments, the system may include RS 120, a station used by a search and rescue team to locate a disabled vehicle. Such a station may be a mobile system (such as a tablet computer). The RS 120 has a wireless communications link to the vehicle (UAV 100).

The RS 120 may have different forms. For example, the RS 120 may have an auxiliary application or USB module implemented in software to add to tablet device with a display to show an interface that is used for tracking, control and mapping. The RS 120 may have a physical hardware solution as a stand-alone device. It may be a modular hardware device that can add or connect to other devices.

In some embodiments, RS 120 is built into VCS 110 and is accessible as software or hardware functionality within VCS 110. In some embodiments, RS 120 is a separate device from the VCS 110. There may be multiple RSs 120 associated with a single UAV 100. An example embodiment is to have RS 120 built into the VCS 110, and multiple additional RSs 120 which are separate devices.

In some embodiments, the system may comprise EMS 130, the system on the vehicle (UAV 100) which handles emergency mode situations and which may also handle system logging via an Independent System Monitor (ISM) 150. In an embodiment, EMS 130 is built as a separate piece of electronic hardware from UAV 100 so as to provide greater redundancy and the possibility of ruggedization. In some embodiments, EMS 130 may be built into the same hardware as the central electronics of the UAV 100 for reasons of possible reduced cost and complexity. In some embodiments, EMS 130 may comprise a software system running on the CPU of the UAV 100.

Figure 2:
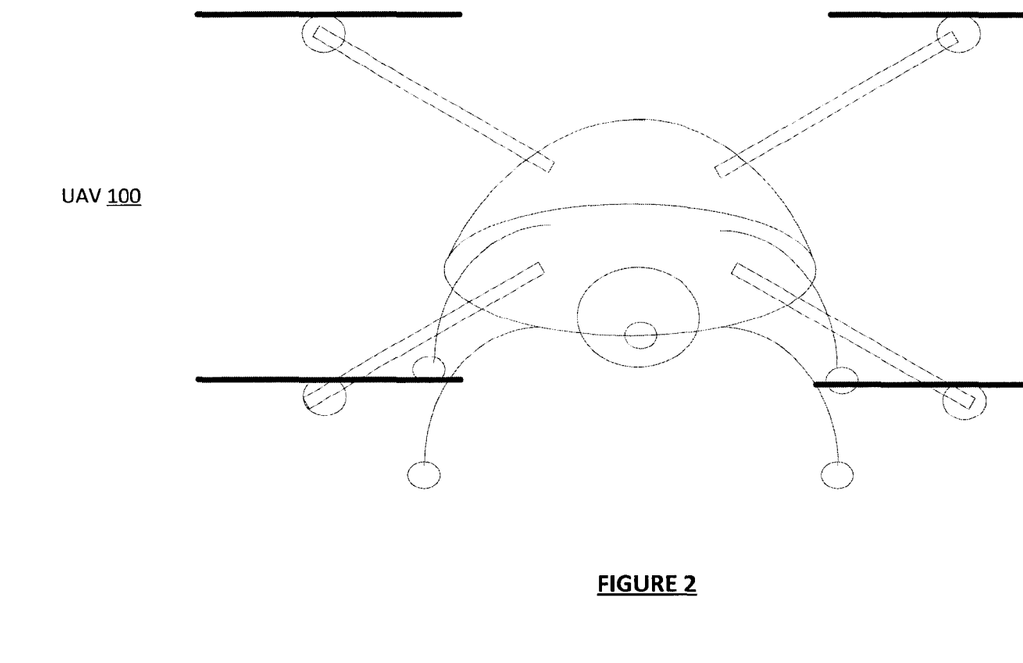
FIG. 2 is a view of an example UAV device.

FIG. 2 illustrates a schematic view of UAV 100 (FIG. 1) with a frame that connects external hardware (e.g. navigation instruments, flight instruments, sensor subsystem 144 and camera 143) and encloses internal hardware (flight control subsystem 134, a navigation control subsystem 135, a communications subsystem 145, an operations controller or central computer or processor 155, a calibration control subsystem and calculator 185) as shown in FIG. 1. In some embodiments, calibration control subsystem 185 may form part of operations control 155.

Operations controller 155 transmits control commands to other components to control operation of the UAV 100. Calibration control subsystem and calculator 185 provides control commands to the operations controller 155 to trigger calibration of at least one magnetic sensor, such as a magnetometer. The magnetometer is a magnetic sensor and may not necessarily be magnetized itself. For example, calibration control subsystem and calculator 185 initiates a hover mode and a calibration rotation sequence.

Calibration control subsystem and calculator 185 is configured to compute different calibration parameters from sensor 144 data. For example, calibration control subsystem and calculator 185 may compute offset values, including bias, scale, hard-iron, soft-iron, rotation of field offset value, and so on. Calibration control subsystem and calculator 185 may also compute heading, elevation and bank angle from readings from a dual-axis magnetometer and triaxial accelerometer sensors. UAV 100 may implement a compass system that compensates for environmental factors (e.g. wind) or physical tilt of UAV 100 which may impact heading, elevation and bank angle calculations. UAV 100 uses calibration control subsystem and calculator 185 to calibrate out hard-iron and soft-iron effects on heading calculations to counter their impact when using magnetometer data. This may correct calibration in two dimensions or three dimensions. Although shown jointly, calibration calculator, which forms part of the calibration control subsystem and calculator 185, may form part of the operations controller 155.

Flight control subsystem 134 controls flight instruments in response to control commands from the operations controller 155, including control commands for an emergency control or operations state. The flight instruments are controlled by flight control subsystem 134 to control motion of UAV 100. For example, UAV 100 implements a hover mode for maintaining the unmanned aerial UAV 100 at a hover position in the air. UAV 100 implements an emergency mode for moving the unmanned aerial UAV 100 to an emergency landing or other maneuver. The flight instruments are also configured to control motion of the UAV 100 to implement the calibration rotation sequence for rotating the UAV 100 around different axes of its frame. Navigation control subsystem 135 controls navigation instruments in response to control commands from the operations controller 155. Navigation control subsystem 135 interacts with the flight control subsystem 134 so that navigation and flight instruments work together to implement the hover mode and the emergency mode. Sensors 144 obtain measurement data during the calibration rotation sequence and normal operating mode to detect critical data identifying vehicle distress or other emergency state. Sensors 144 include at least one magnetic sensor for calibration, such as for example a magnetometer, GPS, and so on. As described in further detail herein, calibration calculator calculates calibration parameters (e.g. bias factor and a scale factor) using the measurement data obtained during the calibration rotation sequence for calibration correction.

Sensors 144 may include different types of sensors, and may provide navigational instruments and flight instruments. As noted, an example sensor 144 is a GPS or magnetic sensor or magnetic field sensor, such as a magnetometer, which is used to measure the magnetization of a magnetic material, magnetic field strength, changes to the magnetic field strength, and the direction of the magnetic field at the current location of UAV 100. A measurement unit may include an accelerometer and magnetometer to compute heading, elevation or bank angle of UAV 100. Other example sensors include navigation instruments such as a gyroscope (e.g. device for measuring and maintaining orientation, measuring rotational velocity, and so on) and a magnetic compass. Sensors 144 may also include position instruments such as an accelerometer (e.g. device that measures proper acceleration or linear acceleration or g-force) and a GPS. The position instruments may be used to stabilize position of the UAV 100 and may include instruments for angle, displacement, distance, speed, and acceleration. Sensors 144 may also include acoustic, sound and vibration instruments, transportation instruments (e.g. speedometer), chemical instruments, electrical instruments, magnetic instruments, and radio instruments, environmental, weather or moisture instruments, fluid flow instruments, radiation instruments, optical or light sensors, pressure instruments, force or density instruments, thermal instruments (e.g. thermocouple, thermometer), proximity instruments, and so on. Sonar range finders, laser range finders, and cameras are other example sensors. Communication subsystem 145 transmits UAV 100 status data and measurement data obtained during the calibration rotation sequence, along with other data including calibration parameters, such as a bias factor and a scale factor, to VCS 110 or RS 120. Measurement data or calibration parameters may also include rotational velocity, linear acceleration, magnetic field strength, and other data obtained or calculated from sensor subsystem.

UAV 100 may be associated with a UAV 100 data set (e.g. data collected or computed for a specific UAV 100) that may be updated in real-time or near-real-time. The data set for each UAV 100 may be stored and updated at a remote data storage device of VCS 110 or RS 120, or a subset thereof may be stored and maintained at a local data storage device of operations controller 155.

For example, UAV 100 may have an associated "ground level" measurement which indicates the altitude of the ground at the UAV 100 take-off location. UAV 100 may have an associated "ground height" which is defined as the distance of the UAV 100 above ground level or from VCS 110. UAV 100 may have an associated "hover position" or height which is defined as the distance of UAV 100 above ground or from VCS 110 to be maintained such that the UAV 100 hovers at the hover position while implementing a hover mode during the calibration process.

Figure 4:
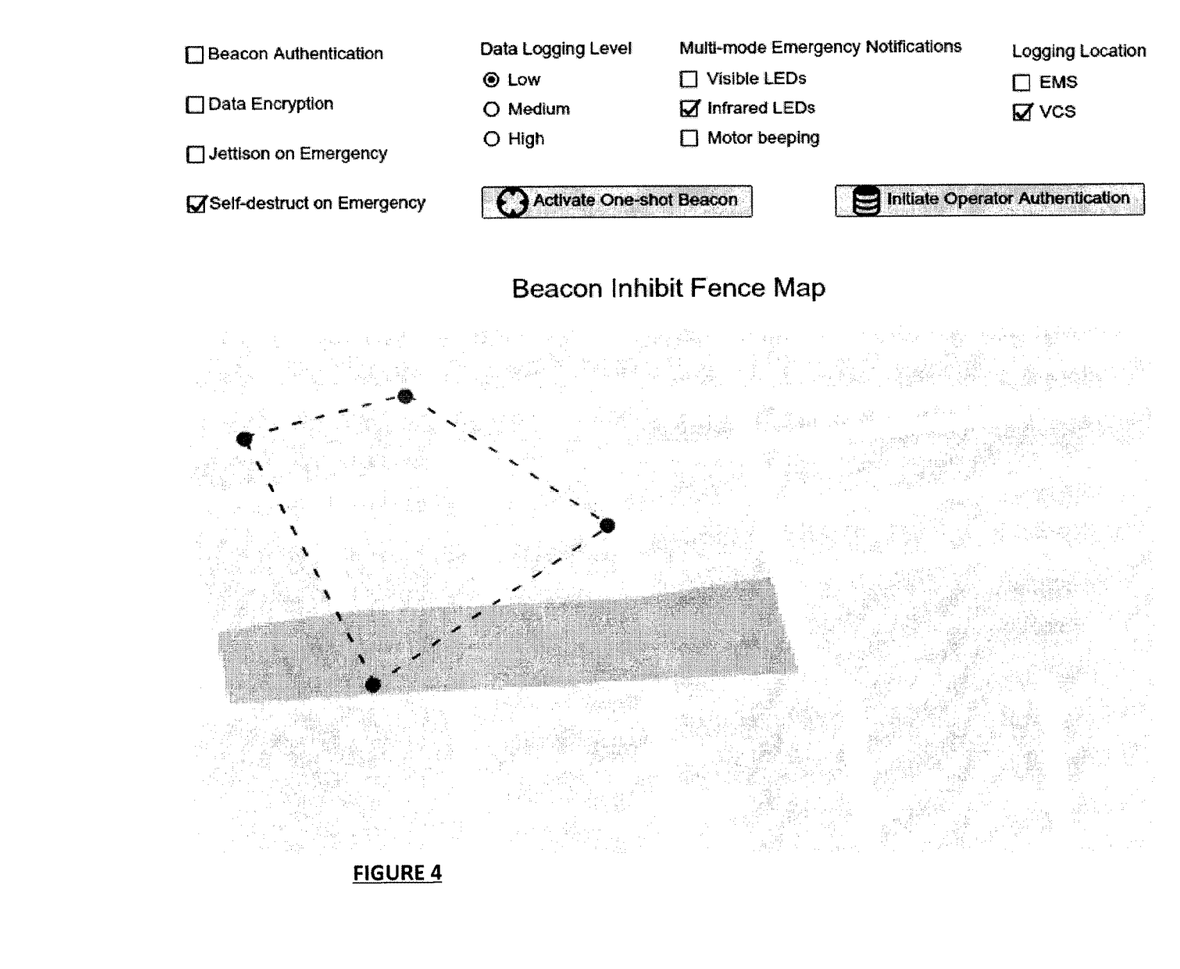
FIG. 4 is a view showing an example interface for an EMS.

UAV 100 may have associated relative height measurements, such as a height relative to other UAVs 100, VCS 110, or RS 120. The relative heights may be used to prevent collision and to maintain a specific minimum altitude (e.g. hover mode). Ground height may not be considered a similar dimension to X and Y dimensions; it is measured differently, with different error ranges and error conditions, and is generally considered an adjunct to two-dimensional flight navigation. An immediate at-a-glance view of the heights (via a graphical representation on UI 250, for example) allows the user to understand the altitude situation of UAVs 100. In many situations, the user seldom needs to drill down to details about absolute height during normal flight apart from maintaining a minimum safe altitude, but often needs a general idea of relative heights, and a general idea of vertical velocity (i.e. rising vs. falling).

The UAV 100 data set may be gathered by the UAV 100 sensor subsystem 144 and transmitted to the VCS 110 by communications subsystem 145 of UAV 100 in order to monitor the data and automatically detect an emergency or distress state.

UAV 100 may implement different flying modes and flight plans, including emergency flying mode, manual flying mode and waypoint flying mode. An emergency flight plan may be relative to other objects, such as another UAV 100 or RS 120, or may be absolute defined by navigational data. A waypoint is a user-specified position, represented on by coordinates on a map to provide a waypoint indication. It is a navigable marker, meaning that a UAV 100 may be directed to go to that position. There may be attributes associated with the waypoint, such as specific actions that a UAV 100 must take upon reaching the waypoint (e.g. take photos, send back photos, deliver a payload, aim a payload, trigger a payload to sample, land, move to a specific height, pause before continuing on the waypoint route, raise an alert at the control station, or some other set of actions), a minimum or maximum altitude which the UAV 100 must not exceed while within a specified proximity to the waypoint, a maximum velocity which the UAV 100 must not exceed when within a specified proximity to the waypoint, or some other attribute.

A flight plan may consist of multiple waypoint routes, with each waypoint route associated with one or more UAVs 100. An emergency flight plan may consider different special areas, including a no-fly zone, points of interest, targets, perimeters, and so on.

A waypoint route is a series of connected, directed vectors representing the desired path of travel for the UAV 100 from a start point to an end point, and optionally moving through any number of intermediate navigable markers (waypoints or points of interest). There may be attributes associated with each vector in the waypoint route, such as a maximum, minimum, desired or default velocity (which may be specific to the vector or may be shared across the entire waypoint route); a maximum, minimum, desired or default UAV height (which may be specific to the vector or may be shared across the entire waypoint route); or a specific action for UAV 100 to take while travelling along the vector (e.g. take photos, send back photos, aim a payload, deliver a payload, trigger a payload to sample, raise an alert at VCS 110, or some other set of actions).

A no-fly zone is conceptually a boundary though which a UAV 100 may not pass, such that a UAV 100 may not be located within the no-fly zone. A no-fly zone may be a closed boundary, ordered series of points, and the lines connecting these points, a regular shape, such as a circle or oval, with specified defining characteristics (e.g., for a circle, center point and radius).

A point of interest ("POI") is a navigable marker (that is, a marker to which the UAV 100 may be navigated), unless it is located within a no-fly zone. A POI may also be used as a target for camera viewing, sensor readings, or as an objective point for another on-vehicle payload.

A target is a non-navigable marker (that is, a marker to which a UAV 100 may not be navigated). A target is often used to indicate an objective point for camera viewing, sensor readings, or some other on-vehicle payload. A target may be contained within a no-fly zone.

A perimeter is conceptually a shape, the boundary across which a UAV 100 may not pass, such that the UAV 100 must be located within the perimeter. A perimeter may be a closed shape, ordered series of points, and the lines connecting these points, or a regular shape, such as a circle or oval, with specified defining characteristics (e.g., for a circle, center point and radius).

In order for the UAV 100 to accurately implement different flying modes (including emergency mode) and flight plans, sensors 144 (e.g. magnetic sensors) and other navigation instruments and flight instruments with magnetized or magnetic components should be properly calibrated to ensure proper operation of the UAV 100. As an example, accuracy of position control, measured as the error between the desired and actual position of the UAV 100 over time, may depend on the accuracy of the calibration of the various sensors 144. The emergency mode may or may not inhibit calibration process depending on current status (e.g. low power, discrete mode).

Figure 3:
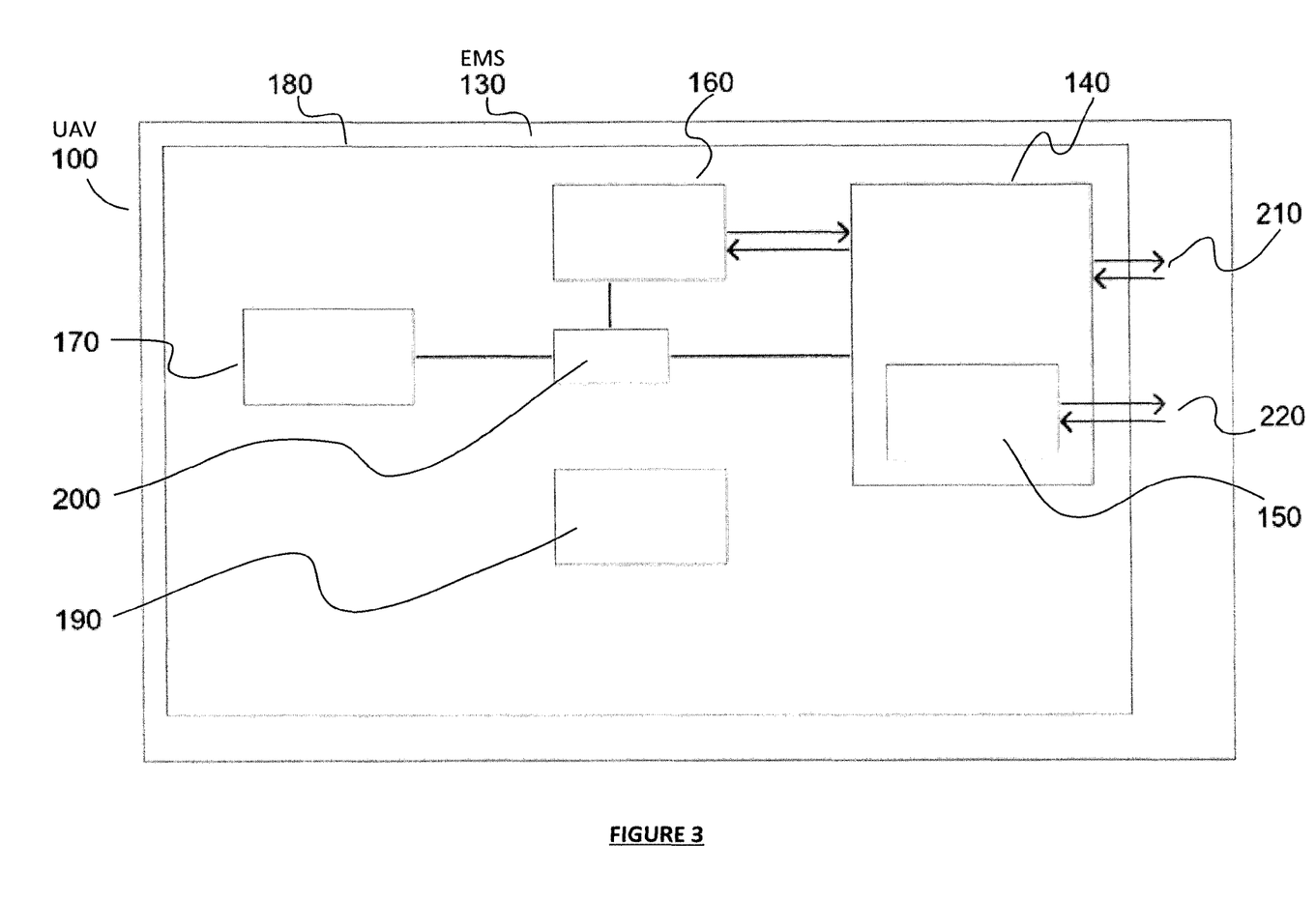
FIG. 3 is a view of an example UAV or UMV device configured with an EMS.

FIG. 3 is a view of an example UAV or UMV device configured with an EMS to trigger and control the emergency operation mode.

FIG. 3 shows a separate, physical EMS 130, which may comprise one or more of these physical subsystems or components: a CPU or microcontroller 140, an ISM 150, a storage subsystem 160, a UBT 170, a tamper-proof, ruggedized case 180, a rechargeable, high power, low energy storage device 190 such as a super-capacitor, to provide the energy necessary to jettison a peripheral or the entire EMS 130, if such a requirement exists, a long-life, low-power energy storage device 200 such as a coin cell battery, to provide power for UBT 170 and other on-board systems, a standardized peripheral interface 210, a standardized electronic interface 220 between the CPU and the electronics of the UAV 100.

The UBT 170 is a lightweight radio beacon. It is controlled by EMS 130, and may transmit a simple radio signal or a modulated signal containing encrypted data. UBT 170 may be a wireless transceiver, or may be implemented as a transmitter. UBT 170 may be triggered automatically during UAV 100 distress, or may be inhibited either permanently or temporarily until an appropriate message is received.

ISM 150 is a system monitor which may function as both watchdog monitor for vehicle components and logging system. In an example embodiment, ISM 150 is a process which runs on the processor in the EMS 130. ISM 150 has direct control over the storage subsystem in EMS 130. ISM 150 stores (i.e. accepts) the data and handles its storage in storage subsystem 160. In an example embodiment, storage subsystem is a flash-memory card which stores data as directed by ISM 150.

UAV 100 may be said to be in distress or in an emergency state if some element of its system is not operating normally, or if the UAV 100 cannot be operated normally. Examples of an element not operating normally would be a plane with a broken wing or a boat with a hole in its hull. An example of the UAV 100 being unable to operate normally would be the loss of power as a result of depleted batteries.

A person, team or organization may be said to be friendly (or known) if the presence, location and actions of UAV 100 do not cause concern for the person, team or organization, and if any data from the UAV 100 may be recovered by such a person, team or organization without concern from the owner or operator of UAV 100.

A UAV 100 may be said to be disabled if it cannot move under its own power. An example would be a plane with a broken wing which has crashed.

A search and rescue team 230 may include either at least one person tasked with this recovery, or at least one unmanned recovery system. In the event that a UAV 100 is disabled, the owner, operator or some other friendly party may elect to attempt to recover the UAV 100 or the information stored within it. Each member of the search and rescue team 230 may have access to an RS 120. In an example embodiment, RS 120 has access to any authentication and encryption keys needed to communicate with the disabled EMS 130 of the UAV 100.

Log Encryption

The logging performed by the Emergency Mode System (EMS) may be encrypted. In one embodiment, a user interface element (described below) may turn on/off the logging. In another embodiment, a user interface element (described below) may change the detail level of the logging. In another embodiment, a user interface element (described below) may turn on/off the encryption. In another embodiment, a user interface element (described below) may cause certain encryption—related modes in the EMS to change. Encryption on the EMS may take the form of one or more of these embodiments:

An encryption key or a default encryption key, may be coded directly into the firmware on the EMS, or into the firmware of the vehicle.

An encryption key may be manually entered directly into the EMS, into the vehicle, through a keypad or any user interface. Such a user interface may be mounted directly onto the EMS or may form part of a user interface on the vehicle itself.

An encryption key may be transmitted from the vehicle's control station to the EMS or vehicle directly through a wired link.

An encryption key may be transmitted from the vehicle control station to the EMS or vehicle through a wireless link. Such a wireless link may be a direct link or may include one or more routing or relay links.

An encryption key may be transmitted to the vehicle or EMS through the workings of a key exchange mechanism between the vehicle control station and either the vehicle or the EMS itself.

If the key is stored on the vehicle, the key may be transmitted to the EMS at any time when a communications link is available between the vehicle and the EMS. It may be advantageous for the key to be transmitted from the vehicle to the EMS at the time the vehicle is initialized or at a time when encryption-related settings are changed on either the EMS 130 or the vehicle 100. If the key is transmitted, in some way, from the vehicle's control station, such a key may have originated from one or more of these systems:

The key may have been manually entered through a user interface on the vehicle control station.

The key may have been programmatically generated by the vehicle control station.

The key may have been downloaded into the vehicle control station from another source.

FIG. 4 shows an example of user interface (UI) 250 of the VCS 110. A number of user interface elements and related systems may be employed with the EMS 130.

In some embodiments, the UI 250 comprises one or more of a switch, toggle, radio button, slider, checkbox, pull-down menu, text entry field or any other user interface element on the VCS 110, may be used to modify the state of a control variable on either the UAV 100 or EMS 130, through a wired or wireless communications link to either the UAV 100 or to the EMS 130 directly. In some embodiments, the user may use a separate RS 120 to modify the state of a control variable on the EMS 130 through a user interface element on the RS 120.

In some embodiments, a programmed predetermined condition (e.g. elapsed mission time, expiry of a user-set countdown timer, temperature at the VCS 110) may trigger the VCS 110 to autonomously send a command to the UAV 100 or EMS 130 to modify the state of a control variable on either the UAV 100 or the EMS 130 (e.g. trigger emergency state). In some embodiments, a predetermined condition on the RS 120 may trigger the RS 120 to autonomously send such a command to the EMS 130. In either case, a UI 250 element may control whether such a command would be sent, and may modify the variables pertaining to such a condition (e.g. setting the value of a countdown timer, specifying whether such a timer should be running, resetting such a timer, specifying whether such a timer should send a message on its expiry).

In some embodiments, a user interface on a VCS 110 provide map-based control which may allow for zones (or fenced-in areas) for no-fly areas for a UAV 100. A fenced-in zone may be created on a UI 250 of the VCS 110. The entry of a UAV 100 into a zone causes the state of a control variable to be modified on either the UAV 100 or the EMS 130, through a communications link to either the UAV 100 or to the EMS 130 directly. Exit from a zone causes another change in the state of such a control variable. A single fence crossing may cause more than one such control variable to be modified. In some embodiments, a fenced-in zone may be established on the UI 250 of the VCS 110 such that crossing into the zone disables event logging on the EMS 130. In the UI 250 embodiment in FIG. 2, the Beacon Inhibit functionality is tied to a fence map. Such a map may be a standalone map, or the fence may be overlaid onto another UI 250 element's map. For instance, the same map may be used for UAV 100 navigation, with multiple fences or perimeters overlaid onto the map.

Some embodiments contemplate employing any of the above systems (direct manual control, programmatic control, map-based control) individually or in concert, to modify any of these variables or modes, individually or in concert: Data Encryption, Logging Filtering/Detail Level, Logging Location, Jettison Control, Beacon Inhibit, Beacon Authentication Requirement, Beacon Information, Multimode Emergency Notifications, and Self-Destruct.

Data Encryption

Data which is stored within the EMS 130 may be stored without encryption, for ease of access. When this toggle is activated, the EMS 130 will selectively encrypt information which is then stored in the storage subsystem 160. This may include: flight variable information, map/GPS information, sensor 144 readings, video or audio recordings, internal system variables, any other information which may be stored in the storage subsystem 130. Each type of data may have a separate encryption toggle, with an overall encryption toggle which turns encryption on or off for all logged data types.

Logging Filtering/Detail Level

For a number of reasons, it can be advantageous to filter the logging in a UAV 100, meaning that not every "loggable" event is actually logged in storage subsystem 160. In some situations, the data may be sensitive, and logging it increases the risk of its falling into the wrong hands. In some situations, the capacity of storage subsystem 160 is limited, and by reducing the amount of data being logged, storage subsystem 160 is able to log for a longer period of time.

In the example embodiment, each type of data has a filter variable associated with that data type, which variable is interpreted by the system such that the storage subsystem 160 stores such data types with the variable in one state, or otherwise doesn't store them.

In the example embodiment, there is a logging inhibit toggle variable in the EMS 130 which prevents any data from being stored in the storage subsystem 160 when the variable is in one state.

In the example embodiment, there is a logging detail level variable in the EMS 130 which specifies the level of detail (i.e. how much information) to be logged. When the variable is in one state, all possible data is logged. When the variable is in another state, only a certain subset of data (e.g. data which is specified to have above a certain priority level) is logged.

In the example embodiment the logging detail level can be programmatically modified based on events determined by the ISM 150 (ex. critical failure events increase logging). In this embodiment, a small non-volatile buffer of the maximum logging rate could be kept and saved in the event of a critical failure, providing high resolution of the events leading up to the failure.

In the example embodiment, the level of detail or frequency of stored log data can be programmatically modified to vary based on the age of log messages. In this embodiment, the storage subsystem 160 could store the most recent data with high detail or frequency, while log data from earlier in the mission is automatically modified to a lower level of detail or frequency. This is to enable efficient use of limited storage. In this embodiment, the entire mission is captured, with the highest level of detail available for the most recent period in the event of a critical failure. In one embodiment of this aspect, a circular buffer may be used for storing log messages, with the level of logging detail of a message being flagged with a logging detail indicator in each message to be logged. When the circular buffer attempts to overwrite an old log message with a new one, this logging detail indicator is checked: if the indicator indicates a low-detail message (i.e. one which should be stored for a longer period of time, in the lower-detail tail of the log), the indicator is removed, but the old log message is retained intact, and the buffer pointer increments to attempt to overwrite the next old message. If, instead, the old message's indicator indicates a high-detail message, the old message is overwritten by the new message. In this way, low-detail messages survive an additional writing pass through the circular buffer, which preserves them for a longer period of time. When the buffer is later interpreted, a timestamp (stored with each message) may be used to reorder the logged messages.

Logging Location

Some embodiments may log some data not within the EMS 130 itself, but on the VCS 110. In one embodiment, there may be a logging location variable on the EMS 130 which, in one state, indicates to the system that data to be logged should be sent over the communications link to the VCS 110.

Jettison Control

In some situations, it may be advantageous to have the EMS 130 jettison itself or to jettison just a radio beacon (see below). In the example embodiment, there is a jettison control variable in the EMS 130, which variable by its state permits or inhibits jettisoning in the event of an emergency condition on the UAV 100. One possible embodiment of this is a "dead man switch" for the jettison, which can be activated automatically on takeoff and landing events, or through manual control. In the example embodiment such a jettison control variable may be tied to a map-based control on the VCS 110 so that the decision to jettison or not is based on the location of the UAV 100; however, direct manual control and/or programmatic control are also contemplated.

Beacon Inhibit

In some situations, such as a search-and-rescue in unfriendly territory, it is advantageous for a disabled UAV 100 not to transmit a beacon, so as to prevent location of the UAV 100 by unfriendly parties. In the example embodiment, there is a beacon inhibit variable in the EMS 130, which variable by its state permits or inhibits the beacon from being activated. In the example embodiment, such a variable may be tied to a map-based control on the VCS 110 so that the decision to inhibit the beacon is based on the location of the UAV 100; however, direct manual control and/or programmatic control through the VCS 110 are also contemplated. Control of such a variable may be tied to a direct manual control on an RS 120.

Beacon Authentication Requirement

In some situations, it may be advantageous to have the emergency beacon in the EMS 130 only activate when the system receives a signal from an authenticated source (as described below). In the example embodiment, there is a beacon authentication requirement toggle variable in EMS 130, which variable by its state permits or inhibits the beacon from being activated in the absence of receiving an authenticated search-and-rescue signal. In the example embodiment, control of such a variable may be tied to a map-based control on the VCS 110 so that the decision to require an authenticated search-and-rescue signal is based on the location of the UAV 100; however, direct manual control and/or programmatic control through the VCS 110 are also contemplated. Control of such a variable may be tied to a direct manual control on an RS 120.

Beacon Information

In some situations, it may be advantageous for the emergency beacon in the EMS 130 to send supplementary information such as recently-recorded video, GPS data, flight information, or any other data available on the UAV 100 or EMS 130. In other situations, it is advantageous for the beacon not to transmit any data. There may be a beacon information variable in the EMS 130, which variable by its state specifies what information should be transmitted in the emergency beacon signal.

Multi-Mode Emergency Notifications

In some situations, it may be advantageous for an EMS 130, in emergency mode, to signal the presence of the UAV 100 to a search-and-rescue team not only through a radio signal beacon, but through alternate means (as described below). There may be a multi-mode emergency notification variable in the EMS 130, which variable by its state specifies which multi-mode notifications, if any, should be enabled in the event of an emergency.

Self-Destruct

In some situations, it may be advantageous for an EMS 130 to render itself inoperable, to render the UAV 100 inoperable or to render any data in the EMS 130 or UAV 100 unreadable. Such a self-destruct may be done by the EMS 130 erasing all data and program code from system storage, by a mechanism which causes the EMS 130 or UAV 100 to ignite, or through some other means. There may be a self-destruct variable in the EMS 130, which variable by its state specifies whether a self-destruct action is to be taken in the event of an emergency.

One-Shot Beacon

In certain situations, such as a search-and-rescue operation in unfriendly territory, it may be advantageous to cause an inhibited beacon to send a single beacon burst ("One-Shot Beacon") on demand. This reduces detectability of the UAV 100 to unfriendly parties over a standard radio beacon, as the beacon is not constantly transmitting. In addition, this implementation helps preserve battery power, which increases the maximum time available while the EMS 130 is operational, which in turn increases the amount of time available for UAV 100 recovery.

A direct manual control UI 250 element (described above) sends a One-Shot Beacon message to the EMS 130, which then causes a single beacon burst to be transmitted. Each subsequent One-Shot Beacon message sent to the EMS 130 also causes a single beacon burst to be transmitted. Optionally, depending on the state of the Multi-Mode Notifications toggle (described above), the EMS 130 may cause a single burst of multi-mode notifications to accompany (or supplant) the beacon burst.

In the example embodiment, the One-Shot Beacon may be combined with the Authenticated Control and Recovery System 300 described below, to prevent unfriendly parties from activating the EMS 130 beacon and multi-mode notifications.

Independent System Monitoring (ISM)

Some embodiments contemplate separate monitoring of system functions ("watchdog monitoring"), which is important as a back-up function, as well as for coordinated logging of all data on the UAV 100. In the example embodiment, a separate system logs and acts as a watchdog monitor for better reliability and performance. In some embodiments, logging and watchdog monitoring may be performed by the main CPU for reliability and performance.

In the example embodiment, the ISM 150 is contained within a tamper-proof, hardened case. In the example embodiment, UBT 170 provides ISM 150 functionality. In some embodiments, ISM 150 may be contained within a UBT 170, or both ISM 150 and UBT 170 may be housed within one unit.

In some embodiments, ISM 150 has access to much of the data generated by and sent to the UAV 100, where the ISM 150 is separate from the main CPU of the UAV 100, the ISM 150 is in a position to act as a system watchdog independent of the CPUs and controllers otherwise present in the UAV 100. The ISM 150, in this capacity, can observe macro-level events in the system and detect errors based on data from multiple sources.

In some embodiments, as a centralized logging system, the ISM 150 collects data from all parts of the UAV 100 and the VCS 110, and stores it in a storage subsystem 160. The storage subsystem 160 may be solid-state storage medium (e.g. SD card) with associated controller, but may involve any form of data storage (e.g. a hard drive). In the example embodiment, the storage medium does not require power to maintain data that has been written to it.

The ISM 150 may function as the central data logging system for the UAV 100. In this mode of operation, the main CPU of the UAV 100 sends all logging messages to the ISM 150. As well, if there are other CPUs or microcontrollers on board, they also send logging messages to the ISM 150. Logging messages (or debug output messages) may contain internal status information, data from sensors, or any other data. The data logged in the ISM 150 may be stored in a way compatible with court evidentiary standards, so that the data in the ISM 150 may form a legal record in court.

In some embodiments, ISM 150 may function as a central store for video, audio or other sensor 144 recordings. This data may be stored in the ISM 150 by the main CPU of the UAV 100, or, the main CPU may direct the sensor in question to send data directly to the ISM 150.

The ISM 150 may also function as a store for data coming from the VCS 110 or other part of the vehicle's control infrastructure. Such data may be relayed by the main CPU of the UAV 100 to the ISM 150. While all communications from the VCS 110 may be logged, in the example embodiment, a filtering mechanism as described above may reduce the amount of data being stored in the ISM 150. In some embodiments, a separate logical communications channel from the VCS 110 may carry data that is specifically intended to be logged, or certain data from the VCS 110 may be identified as being intended to be logged.

Logging from disparate sources may present a synchronization problem: it may be difficult to tell when each logging message was generated, and in which order they should be logged.

In one embodiment, the ISM 150 may simply log messages in the order they are received. In some embodiments, a logging-time timestamp may be stored with each message.

In one embodiment, there may be timestamps attached to logging messages, and the ISM 150 may implement a buffer to hold messages before they are logged. If a message is received which is out of sequence as per its timestamp, the message may be inserted into the buffer before the buffer is written to the main storage. An advantage of this embodiment is that, provided the buffer is large enough to accommodate all possible message delays, the log stored in main storage is generally in the correct order. A disadvantage of this embodiment is that if the system were to lose power or otherwise stop functioning, generally the data in the buffer is more likely to be lost than data in the main store is.

In the example embodiment, the ISM 150 may log messages in the order they are received, with originating-time and optionally logging-time timestamps stored with the messages. An advantage of this embodiment is that the log is written to the main store as soon as possible, which reduces the likelihood of data loss if the system were to stop functioning. There is additional complexity required in the system which reads and interprets this kind of log, over a simple in-order logging system. Such a system is the most easy to integrate with the detail level filtering system discussed above.

Calculation and synchronization of timestamps between subsystems may be performed. The timestamps of subsystems on the UAV 100 (e.g. individual motor controllers) and subsystems in the VCS 110 or other parts of the UAV 100 control system may be periodically synchronized. When such a synchronization happens, it may be implemented that such a synchronization event is noted in the log.

The primary logging sub-system may be within the ISM 150. In the example embodiment, logging take places on the VCS 110 or some other element of the UAV 100 control system. If this mode of operation is enabled, logging messages generated by on sources on the UAV 100, and may be relayed back to the VCS 110 or other logging system through the wireless communications link. A related mode of operation may split logging of messages between the VCS 110 and ISM 150, such that high-volume data sources (e.g. locally-generated video) and others on the VCS 110 are logged locally into the VCS 110, while other logging sources (e.g. vehicle-generated video) are stored in the ISM 150.

Messaging between the ISM 150 and VCS 110 may synchronize the two logs, so that they may be later reconstituted into a single coherent log. Examples of data that could be logged at the VCS 110 may be microphone input, camera/video input, tap/click/keystroke logging, accelerometer readings based on the VCS 110, etc.

The VCS 110 may locally log data independent of the logging in the ISM 150. In the example embodiment, the VCS 110 timestamps the data being logged in such a way that the log can be reconciled with any ISM 150 log. This would allow for a master log to be compiled from the VCS 110 log, the ISM 150 log, and any other time stamped data, to allow for a complete replay of the mission (including any of audio, video, sensor reading, data entry, etc).

The ISM 150 may store long-term data on flight hours, weather encountered, motor running time (stored per motor), number of battery cycles, or any other long-term data related to performance or reliability of the UAV 100—for maximal usefulness of the log, as much information should be stored as is feasible. The ISM 150 may also store a maintenance schedule for any or all of these types of data. At certain times, the ISM 150 may compare the long-term data to the maintenance schedule, and indicate to the operator (through a user interface on the VCS 110 or on the UAV 100 itself) that maintenance is due. Optionally, the ISM 150 may raise an error if the maintenance schedule has not been followed, and may note that information in the data store.

Provisions for Jettison

In the event of damage or other unfortunate circumstances occurring while the UAV 100 is in unfriendly territory, it may be desired to jettison some element of the EMS 130 to prevent important information from falling into unfriendly hands.

In some embodiments, the ISM 150 can be jettisoned from the UAV 100 independent of the UBT 170 (which may or may not be jettisoned). A subsequent search-and-rescue operation may then recover the UAV 100 based on the beacon of the UBT 170. As the ISM 150 would have been jettisoned, it would likely be lost. One such application may be in a fixed-wing UAV 100 flying over unfriendly waters, on the assumption that a jettisoned ISM 150 would be difficult or impossible to locate in a large body of water.

In some embodiments, the UBT 170 can be jettisoned from the UAV 100 independent of the ISM 150 (which may or may not be jettisoned). A subsequent search-and-rescue operation may then locate the UBT 170, and thereby locate the UAV 100 itself based on factors such as the vehicle's trajectory before impact. Under this scenario, the UBT 170 may maintain radio contact with the UAV 100 until the UAV 100 is on the ground, with the UAV 100 sending its GPS coordinates to the UBT 170 (e.g. in an encrypted fashion); upon subsequent recovery of the UBT 170, the search-and-rescue team may then extract the vehicle's final GPS coordinates. This scenario has the advantage that unfriendly efforts to locate the UAV 100 would only urn up the jettisoned UBT 170, and without the ability to decode the GPS coordinates stored in the UBT, would not know the location of the downed UAV 100. UBT 170 may also transmit encoded GPS coordinates of the UAV 100, so that friendly search-and-rescuers may move directly to the UAV 100 (as there is might be no need to directly recover UBT 170 itself).

Multi-Mode Notifications

A radio beacon is a straightforward way of directing a search and rescue team 230 to the location of a distressed or downed UAV 100. In some circumstances, it may be desirable to use a different system of location notification to direct the search and rescue team 230 to the UAV 100. These may be activated in the event of UAV 100 distress, or may optionally be activated through the Multi-Mode Emergency Notification toggle discussed in the UI 230 section above.

In some embodiments, Lights or LEDs (or similar illuminants) are mounted onto the frame of the UAV 100. The illuminants may be on continuously, may blink with a constant frequency, may blink with an increasing time between blinks, or may be turned off until directed to blink, turn on continuously, or turn on with one shot, with a message from an RS 120.

In some embodiments, illuminants may only give off infra-red illumination, making their light only visible with infra-red-sensing equipment. This may be in cases where using a radio beacon or visible-light illumination may give away the location of the UAV 100 to unfriendly parties.

In some embodiments, it is possible to cause audible tone generation (or "beeping") through use with some motors, by causing the rotor to move back and forth at an audible frequency. As the sound amplitude is fairly low, this system may be implemented in a radio beacon or visible-light illumination when search and rescue is in the immediate vicinity of the UAV 100 but wishes parties more remotely not to be able to sense the location of the UAV 100. The tone may be on continuously, may beep with a constant interval between beeps, may beep with an increasing time between beeps, or may be turned off until directed to beep, turn on continuously, or beep with one shot, with a message from an RS 120.

Some examples may implement all of these notification systems, or as many of them as is feasible given cost and space constraints.

Self-Destruct in Emergency

In some embodiments, when the UAV 100 encounters distress, it may be desirable for the ISM 150 to destroy sensitive data that may be stored onboard, such as in response to interpreting a self-destruct toggle, described in the UI 250 section above. As well, the EMS 130 may stop the UAV 100 from transmitting any data.

In some embodiments, the UAV may initiate a "Soft Self-Destruct". Upon the UAV 100 notifying the EMS 130 that an emergency has occurred, or upon the ISM 150 detecting that an emergency has occurred, the EMS 130 causes the erasure of all sensitive data in its storage subsystem 160.

In some embodiments, the UAV may initiate a "Hard Self-Destruct". Upon the UAV 100 notifying the EMS 130 that an emergency has occurred, or upon the ISM 150 detecting that an emergency has occurred, the EMS 130 causes the physical destruction of all data storage subsystems 160 on the UAV 100.

Interface

In the example embodiment, the interface is standardized and adaptable so that an EMS 130 may be used with various models of UAV 100.

In some embodiments, the EMS 130 has a fixed specification for the size, weight, mechanical connections and electrical connections. This allows for a physical EMS 130 to be connected to any UAV 100 having an interface. Physical standardization may extend to interfaces allowing for the attachment of peripherals such as an inflatable floatation device, parachute, external self-destruct module, jettison-able external beacon, or other element, in such a way that the peripherals may be activated in emergency situations in standardized ways. The UAV 100-EMS 130 interface may allow for bidirectional power flow, so that the UAV 100 may charge (or power) the EMS 130 during normal UAV 100 operation, but that the EMS 130 may power certain emergency-mode systems on the UAV 100 when in emergency mode.

In some embodiments, the communications interface between the EMS 130 and peripherals, and between the UAV 100 and EMS 130, is standardized such that any peripheral conforming to the specification may be correctly activated by the EMS 130 in the event of emergency. In the example embodiment, the EMS 130 is able to detect the nature of the attached peripheral without user interaction or software modifications; in one embodiment, this may be achieved through a standardized set of pin connections being connected on a peripheral interface, so that the attachment of a specific peripheral electrically connects appropriate pins to allow identification of the peripheral.

In example embodiments, the software environment present on the UAV 100 implements a standardized watchdog monitoring, logging and emergency mode control interface which allows a standardized EMS 130 driver to be created on the UAV 100. Such a standardized interface would not only create a more reliable and more easily substitutable EMS 130 infrastructure, but also allows for the EMS 130 to be more easily tested for conformance and for performance. Such an interface allows for UAV 100 actions or functions to be registered, which actions or functions would be activated or called in an emergency situation. In the example embodiment, such an interface allows for direct control of standardized EMS 130 peripherals (described above) from the software of the UAV 100. Such an interface may allow for the setup of communications, such that the EMS 130 may send wireless communications through the wireless link of the UAV 130 to the VCSs 110.

In the example embodiment, the EMS 130 be implemented in its own tamper-proof, ruggedized case 180. Such a case should contain a ruggedized physical interface to the vehicle's main electronic systems.

Low Power Strategy

In emergency mode, there are three generally conflicting requirements which the EMS 130 should strive to meet: The EMS 130 should be maximally detectable to friendly parties, the EMS 130 should be minimally detectable to unfriendly parties, the EMS 130 should be able to maintain its operation in emergency mode for as long as possible. While efficiencies may be obtained through lower-power electronics or higher-power batteries being used, there are some strategies which may help maximize these requirements.

In some embodiments, the interval between notifications may increase over time. This strategy may be used with radio beacon transmission intervals, LED blink intervals, audio beep intervals, any combination of these, or any other notification scheme. In the example embodiment, the interval for an initial time period is kept constant, with an exponentially increasing interval time after the initial time period.

In some embodiments, the beacon and other notifications may be initially disabled, and only enabled when instructed to do so by an RS 120. The interaction between the EMS 130 and the RS 120 is through an authenticated channel.

In the example embodiment, the interaction between the EMS 130 and the RS 120 is also encrypted.

Figure 5:
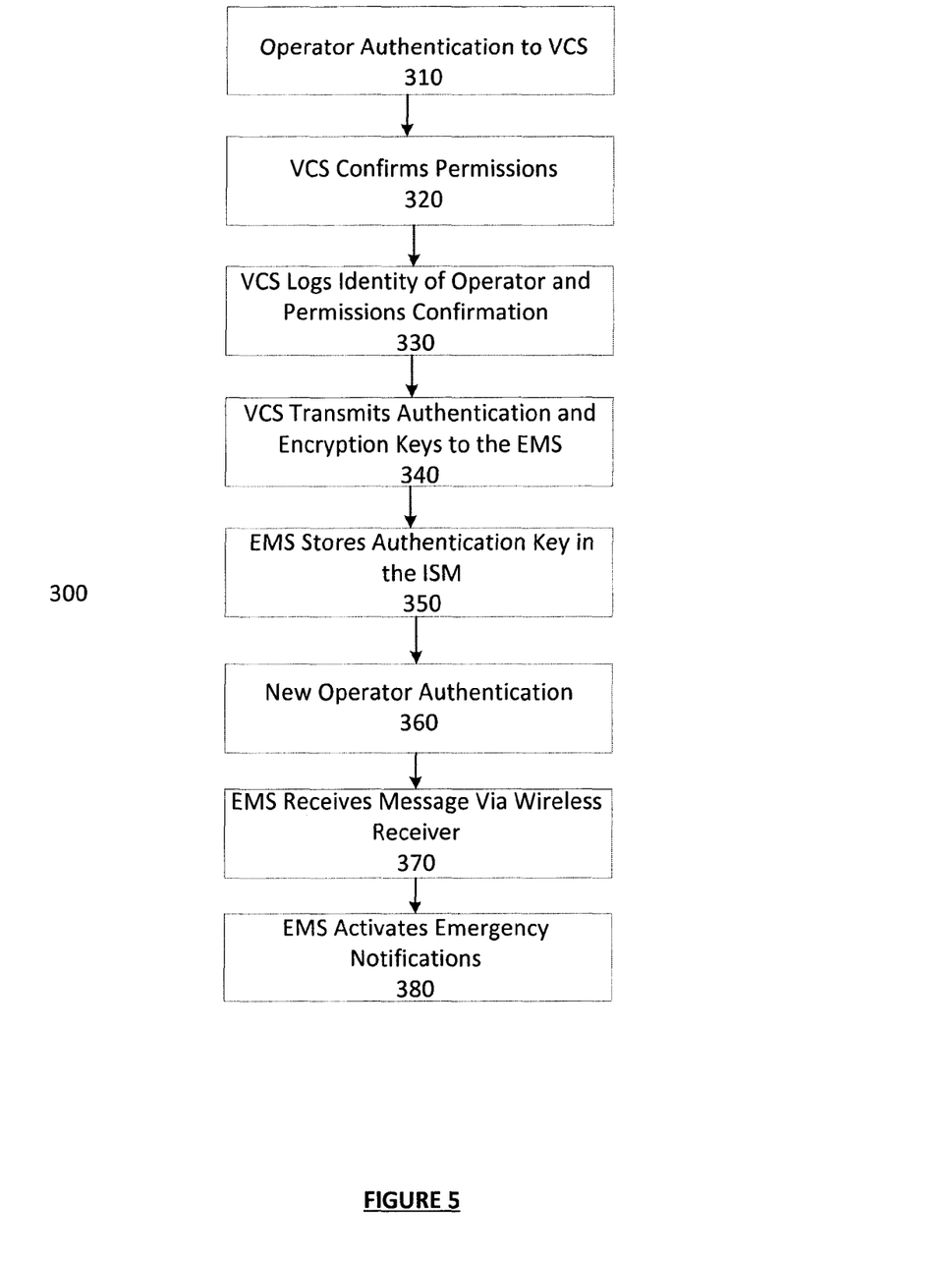
FIG. 5 is a view showing an example process for an EMS.

FIG. 5 is a view showing an example process for an EMS 130. In some example embodiments, the process may only allow friendly groups to locate a downed UAV 100. One way to accomplish this is to require that the receiver of notifications be authenticated. By creating an authenticated link from the VCS 110 and RS 120 to the EMS 130 and UAV 100, numerous advantages may accrue, depending on the embodiment: The identity of the operator may be verified, the qualifications of the operator to operate the UAV 100 may be verified; the logs on the EMS 130 and on the VCS 110 may be better secured against unauthorized access; if the identity of the operator changes during a UAV 100 mission, the time of operator change-over, and the operations undertaken by each operator, may be more accurately logged.

In some embodiments and in general, an authenticated control and recovery system 300 requires the following steps: Operator Authentication to the VCS 110 (310), VCS Confirms Permissions 320, VCS 110 Logs Identity of Operator and Permissions Confirmation 330, VCS 110 Transmits Authentication and Encryption Keys to the EMS 130 (340), EMS 130 Stores Authentication Key in ISM 150 (350), New Operator Authentication 360, EMS 130 Receives Message Via Wireless Receiver 370, EMS 130 Activates Emergency Notifications 380.

Generally, the process may involve authenticating operator identification data of the unmanned vehicle at a vehicle control station to generate an authentication response; recording the authentication response in a data storage device linked to the unmanned vehicle; establishing a secure communication channel between the vehicle control station and the emergency system; transmitting an authentication key from the vehicle control station to the emergency system over the secure communication channel, the authentication key used to generate encrypted notifications by a beacon of the emergency system; storing the authentication key at a system monitor component; generating encrypted log entries using the authentication key, the encrypted log entries for data relating to operation of the unmanned vehicle; detecting one or more emergency events relating to the unmanned vehicle, and in response, inhibiting some or all emergency notifications generated by the beacon of the emergency system; receiving, at the beacon of the emergency system, an additional authentication key to activate some or all of the emergency notifications of generated by the beacon of the emergency system, the emergency notifications encrypted using the additional authentication key. Different illustrative examples are provided herein.

In some embodiments, before the UAV 100 departs on a mission, the operator authenticates himself/herself to the VCS 110. This may be done through a biometric reading taken on the VCS 110 (e.g. thumbprint scan), through the entry of a personal code on the VCS 110, through the use of an identification keycard or similar physical authenticator (with an appropriate reader present on or accessible to the VCS 110), through photographic analysis of the operator (using an appropriate camera present on or accessible to the VCS 110), or through some other authentication system.

In some embodiments, the VCS 110 confirms that the operator indeed has permission to operate the UAV 100. This may be done by looking up the authentication information obtained in step 1 in an appropriate data structure (whether on-board the VCS 110 or accessible to the VCS 110) and confirming that the authenticated operator has the required permission. In the example embodiment, such a data structure is a database. In some embodiments, such a data structure may be comprised of a hard-coded list of authenticated parties. In the example embodiment, such confirmation is performed wherever the data structure is stored, with the VCS 110 receiving a binary response of whether the operator has permission or not. In some embodiments, confirmation of permission may be performed on the VCS 110. In the example embodiment, permission is based on a number of factors which may include the operator's security clearance, explicit permission or denial of permission for the operator to operate the UAV 100, the operator's level of training, the operator's history of UAV 100 operation, or any other factors which may be relevant. In the example embodiment, the permission confirmation process also returns an encryption key for the VCS 110 and EMS 130 to use in their logs; optionally, such a key may be an openly-known key, or may be a single secret key shared by all operators.

In the example embodiment, the VCS 110 records the identity of the operator and the results of the permission confirmation in its log. In some embodiments, the log may be encrypted with the key provided in the step: VCS Confirms Permission 320.

In some embodiments, the VCS 110 transmits the authentication key to the EMS 130, along with the encryption key if one is available, via a secure communication channel. Embodiments contemplate that the channel may be comprised of temporary hard-wired link, a secure wireless communications channel, or some other secure communications system. The channel may be established to the EMS 130 either directly or via the communication system of the UAV 100. In the case of a hard-wired link, direct establishment of the channel to the EMS 130. In the case of a wireless link, there may be an establishment of the channel via the communication system of the UAV 100.

In some embodiments, the EMS 130 stores the authentication key in the ISM 150. If an encryption key is available, the ISM 150 may (depending on the Data Encryption toggle) encrypt some or all of the subsequent log entries. The ISM 150 may also encrypt any unencrypted log entries entered prior to the encryption key being received.

In some embodiments, multiple successive operators are needed. If the identity of the operator changes, the new operator may authenticate to the VCS 110 as per steps 310, 320, 330 above. The VCS 110 may send the new operator's authentication key and encryption key wirelessly to the EMS 130 as per step 340 above. Both the VCS 110 and the EMS 130 may note the new operator's authentication in their respective logs along with a timestamp. If there is a new encryption key available, the logs will be encrypted with the new key from immediately after the operator changeover time.

In some embodiments, the EMS 130 may, in the event of an emergency and depending on the state of the Beacon Authentication Requirement toggle, inhibit some or all emergency notifications (e.g. a radio beacon, multi-mode notifications). As well, EMS 130 may enable a wireless receiver; this receiver may be distinct from the main wireless receiver of the UAV 100. Upon reception of a message via the wireless receiver, which message contains the most—recently received authentication key, EMS 130 may activate some or all emergency notifications. Such a message should be sent by a VCS 110 or RS 120 programmed with the operator's authentication key.

In some embodiments, a separate emergency authentication key may be transmitted to the device along with the regular authentication key, in steps 340 and 360 above. Such a key would decouple the requirements for the identification and authentication of the user during normal operation, from the requirement for authentication of a valid SandR operator during search-and-rescue.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be understood, the examples described above and illustrated are intended to be exemplary only.

What is claimed is:

1. A system for comprising:
   an unmanned vehicle comprising:
      an operations control having a first processor for, in response to control signals received from a vehicle control station, controlling operation, navigation and communication for the unmanned vehicle based on a normal mode and an emergency mode of operation;
      an emergency system with at least one beacon and a second processor for transmitting and receiving emergency signals when an emergency state is activated to transmit over time intervals to communicate with other vehicles or stations and to implement a pairing communication process with the other vehicles or stations to authenticate the other vehicles or stations prior to transmission or emission of the pulse or signal notifications, wherein the transmission comprises the pulse emissions or signal notifications;
   a recovery station having a third processor for establishing a secured wireless communication link with the emergency system to trigger or monitor the emergency mode of operation; and
   wherein the emergency system receives a trigger control activated remotely by recovery station to control the beacon to transmit encrypted emergency signal messages as part of the pulse or signal notifications, where the beacon transmits and receives multi-mode notification messages with the other vehicles or stations when in the emergency mode of operation.

2. The system of claim 1, where the recovery station provides a user interface to control and establish a communication link with the operations control to control operation, navigation and communication for the unmanned vehicle.

3. The system of claim 1, where the emergency system handles operations logging and filters and encrypts log messages for storing on a data storage device.

4. The system of claim 1, where the emergency system comprises a tamper proof ruggedized case and low-power separate energy source for the beacon.

5. The system of claim 1, where the emergency system comprises peripheral interface between the operations control and sensors, and an electronic interface between the second processor and other electronics of the unmanned vehicle.

6. The system of claim 1, where the emergency system may trigger the beacon to emit the pulse signals automatically upon detecting emergency data conditions from sensors, or may inhibit the beacon permanently or temporarily until the trigger message is received and the other vehicles or stations are authenticated.

7. The system of claim 1 further comprising a data storage system for storing sensor data and other emergency data as directed by a system monitor for logging filtered emergency data.

8. The system of claim 1 further comprising a system monitor for logging filtered emergency data to a data storage system.

9. An unmanned vehicle comprising:
   an operations control having a first processor for, in response to control signals received from a vehicle control station, controlling operation, navigation and communication for the unmanned vehicle based on a normal mode and an emergency mode of operation;
   an emergency system with at least one beacon and a second processor for transmitting and receiving emergency signals when an emergency state is activated to transmit over time intervals to communicate with other vehicles or stations and to implement a pairing communication process with the other vehicles or stations to authenticate the other vehicles or stations prior to transmission or emission of the pulse signals or notifications, wherein the transmission comprises pulse emissions or signal notifications;
   wherein the emergency system receives a trigger control activated remotely to control the beacon to transmit encrypted emergency signal messages, where the beacon transmits and receives multi-mode notification messages to provide the signal pulses and to trigger an emergency flight mode;
a flight system for implementing the emergency flight mode in response to trigger control; and
a communication interface for establishing a wireless communication link between the emergency system and a recovery station to trigger the emergency mode of operation or communication by the beacon.

10. The unmanned vehicle of claim 9, wherein the system provides a user interface to control and establish a communication link between an external system and the operations control to control operation, navigation and communication for the unmanned vehicle.

11. The unmanned vehicle of claim 9, where the emergency system handles operations logging using timestamps on signals from the beacon.

12. The unmanned vehicle of claim 9, where the emergency system comprises a tamper proof ruggedized case and low-power energy storage for the beacon.

13. The unmanned vehicle of claim 9, where the emergency system comprises a peripheral interface between the operations control and sensors, and an electronic interface between the second processor and other electronics of the unmanned vehicle.

14. The unmanned vehicle of claim 9, where the emergency system may trigger the beacon to emit pulses automatically upon detecting emergency data conditions from sensors, or may inhibit the beacon permanently or temporarily until message received.

15. The unmanned vehicle of claim 9, further comprising a data storage system for storing sensor data and other emergency data as directed by a system monitor for logging.

16. The unmanned vehicle of claim 9, further comprising a system monitor for logging emergency data to a data storage system.

17. A system comprising:
an unmanned vehicle comprising:
an emergency system with at least one beacon and a first processor for transmitting and receiving emergency signals when an emergency state is activated to emit pulse notifications over time intervals to communicate with other vehicles or stations and to implement a pairing communication process with the other vehicles or stations to authenticate the other vehicles or stations prior to emission of the pulse notifications configurations and protocol;
a recovery station having a second processor for establishing a wireless communication link with the emergency system to trigger the emergency mode of operation when the emergency state is activated; and
wherein the emergency system receives a trigger control to control the beacon to transmit encrypted emergency signal messages, where the beacon transmits and receives multi-mode notification messages to provide signal pulses.

18. The system of claim 17, where the recovery station provides a user interface to control and establish a communication link with an operations control to control operation, navigation and communication for the unmanned vehicle.

19. The system of claim 17, where the emergency system handles operations logging by writing emergency data to a data storage device.

20. The system of claim 17, where the emergency system comprises a tamper proof ruggedized case and low-power energy storage for the beacon.

21. The system of claim 17, where the emergency system comprises a peripheral interface between the operations control and sensors, and an electronic interface between the first processor and the other electronics of the unmanned vehicle.

22. The system of claim 17, where the emergency system may trigger the beacon to emit pulses automatically upon detecting emergency data conditions from sensors, or may inhibit the beacon permanently or temporarily until message received.

23. The system of claim 17, further comprising a data storage system for storing sensor data and other emergency data as directed by a system monitor for logging.

24. The system of claim 17, further comprising a system monitor for logging emergency data to a data storage system.

25. The system of claim 17 configured to implement a jettison for the signals.

26. The system of claim 17 configured to generate and store encrypted log messages relating to operation of the unmanned vehicle using one or more encryption keys received in response to one or more detected emergency events to activate the emergency state.

27. The system of claim 17 comprising a user interface with operation control elements to control operation of the unmanned vehicle based on a predetermined condition or a map-based activation.

28. The system of claim 17 comprising an system monitor to control encryption of data stored at a data storage device located on the unmanned vehicle based on one or more data types associated with the data, the data types including, flight variables, location information, sensor data, video or audio recordings, internal system variables, and emergency events.

29. The system of claim 17 comprising a system monitor to filter data collected by the unmanned vehicle and logging filtered data to a data storage device located on the unmanned vehicle or the emergency system.

30. The system of claim 17 configured to inhibit the one or more beacons in response to a state variable being activated, the state variable based on a map-based control so that the decision to inhibit is based on a location of the vehicle.

31. The system of claim 17 configured to inhibit the one or more beacons in response to a state variable being activated, and trigger single burst signals in response to a demand message.

32. The system of claim 17 configured to self-destruct in response to an emergency message or trigger.

33. The system of claim 17 configured to control the transmission or emission of the pulse notifications over increasingly longer time intervals.

34. The system of claim 17 configured to authenticate the other vehicles or stations prior to the transmission or emission of the pulse notifications.

* * * * *